United States Patent [19]

Chabot

[11] Patent Number: 5,564,227
[45] Date of Patent: Oct. 15, 1996

[54] CONSTRUCTION OF SAP COLLECTING DEVICES

[75] Inventor: Jean-Marie Chabot, Québec, Canada

[73] Assignee: Les Équipements d'Érablière CDL Inc., Canada

[21] Appl. No.: 560,275

[22] Filed: Nov. 21, 1995

[51] Int. Cl.⁶ .................................................. A01G 23/10
[52] U.S. Cl. .............................. 47/52; 285/422; 285/150; 138/103; 138/110
[58] Field of Search .......................... 47/50, 52; 285/422, 285/150; 138/103, 110

[56] References Cited

U.S. PATENT DOCUMENTS

| | | |
|---|---|---|
| 3,056,428 | 10/1962 | Brown et al. . |
| 3,132,067 | 5/1964 | Rauscher et al. . |
| 3,503,800 | 3/1970 | Eddy . |
| 3,663,253 | 5/1972 | Stone . |
| 3,816,610 | 6/1974 | Lusby . |
| 3,857,934 | 12/1974 | Bernstein et al. . |
| 4,095,618 | 6/1978 | Spencer . |
| 4,171,463 | 10/1979 | Watkins . |
| 4,299,053 | 11/1981 | Foote ............................................ 47/52 |
| 4,512,104 | 4/1985 | Lamb ............................................ 47/52 |
| 4,789,005 | 12/1988 | Griffiths . |
| 5,005,314 | 4/1991 | Chabot ......................................... 47/50 |
| 5,014,753 | 5/1991 | Rossignol et al. . |

Primary Examiner—Henry E. Raduazo
Attorney, Agent, or Firm—Quarles & Brady

[57] ABSTRACT

The disclosure herein describes a device for use in a sap collecting system which is formed of a body of fluid impermeable composition that has a passageway for allowing sap to circulate therethrough; the composition consists of a plastics material and of a plurality of randomly distributed non corrosive hard granules. The granules have a hardness to repress rodent animals to pierce the plastics material and are so distributed in the plastic material that at least one granule will be contacted when the body is gnawed by a rodent animal.

12 Claims, 2 Drawing Sheets

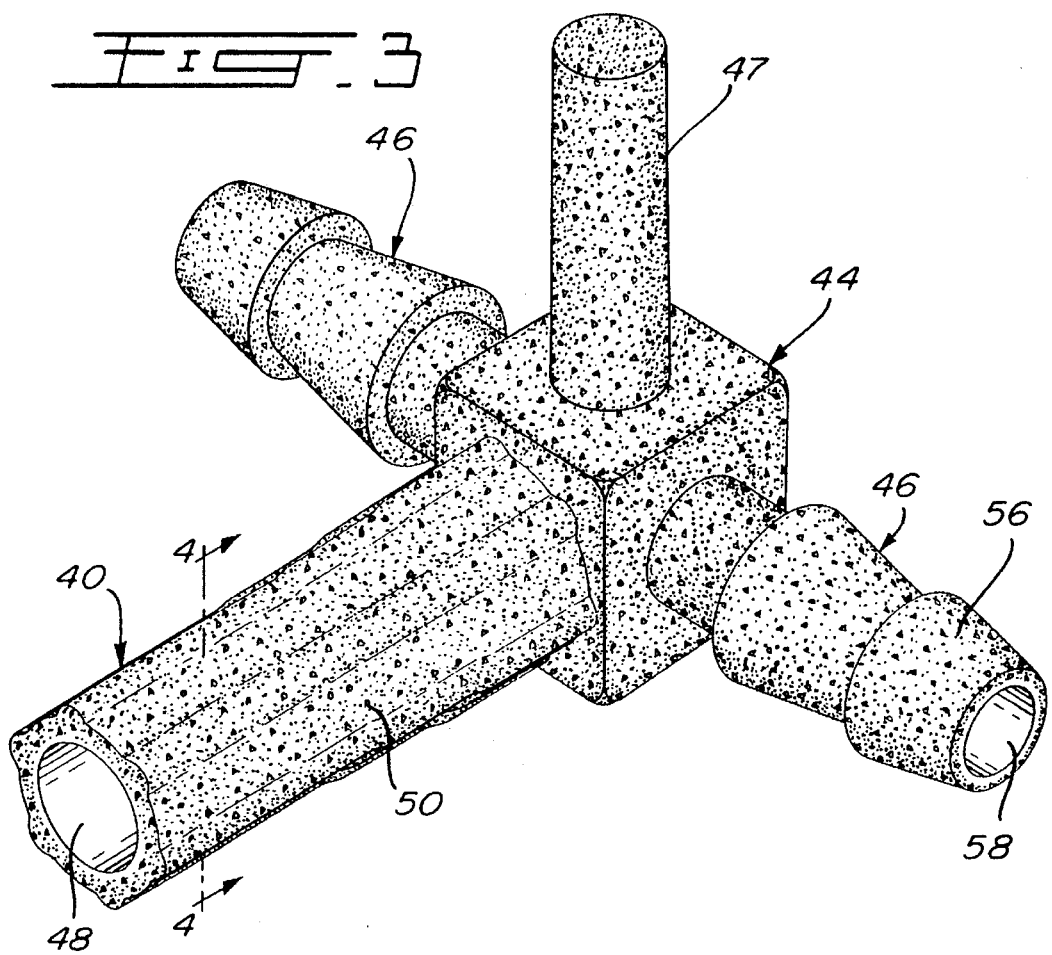
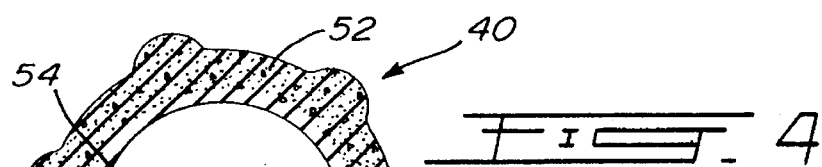
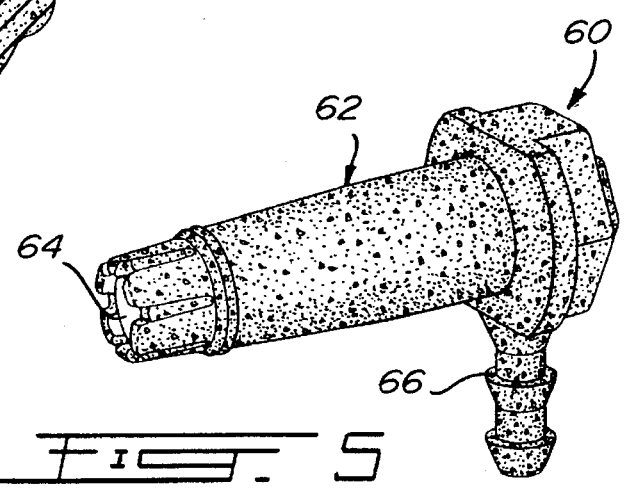

CONSTRUCTION OF SAP COLLECTING DEVICES

FIELD OF THE INVENTION

The present invention pertains to devices which form part of a sap collecting system and which are used to collect sap from a tree and to direct it to a sap processing center.

BACKGROUND OF THE INVENTION

Various devices are used in the collection of sap from a tree and in its transfer to a central processing unit. They include tap spigots which traverse outer layers of the trees to allow sap to be collected and directed to an array of tubular conductors. The latter are interconnected to one another by means of T-shaped connectors, or fittings, allowing the sap to be directed to a main tubular collector from which sap is vacuum pumped to a sap processing center.

The spigots and fittings are normally molded with nylon material (polyamide thermoplastic) while the tubings are molded with food grade flexible polyvinyl chloride or food grade polyethylene.

It has been observed that rodent animals, such as squirrels, frequently pierce or cut the tubes, mostly adjacent its connection to the tree tapping spigots or to the tube connecting devices or fittings. These animals then carry the spigots or spout tapping devices and connecting fittings to remote, usually hidden, areas where, it is believed, they gnaw them for no other reason than that they are rodent animals.

OBJECTS AND STATEMENT OF THE INVENTION

The present invention is concerned with discouraging these rodent animals from piercing or cutting the tubes or damaging the spigots or spout tapping and connecting devices.

It has been found that these rodent animals will not gnaw material having a hard composition.

The present invention is therefore concerned in embedding in the material of all these sap tapping, connecting and conducting devices, hard granules so as to discourage these rodent animals from piercing or cutting them as soon as they encounter one or more of these hard granules.

Hence, the present invention relates to a device for use in a sap collecting system which is formed of a body of fluid impermeable composition defining therein a passageway allowing sap to circulate therethrough; the composition consists of plastics material and of a plurality of randomly distributed non-corrosive hard granules; the granules have sufficient hardness to repress rodent animals to pierce or cut the body and are so distributed that at least one or more granule is contacted when the body is gnawed by a rodent animal.

In one preferred form of the invention, the granules extend within the plastics material but short of the inner passageway so that the flowing sap will not contact the granules. The presence of granules on the inner wall of the passageway will result in the accumulation of bacteria thereon, which bacteria are not easily washed away when the devices are cleaned in the off-season (the speed of souring of sap in the presence of bacteria is almost exponential). Furthermore, the presence of granules on the inner wall of the tubular conductors will inevitably result in some granules to be detached from the wall and be collected in the sap. Filters must then be used to remove the detached granules from the sap.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 3 is a perspective view showing components similar to that illustrated in FIG. 1 and illustrating another embodiment of the present invention;

FIG. 4 is a cross-sectional view taken along lines 4—4 of FIG. 3; and

FIG. 5 is a perspective view of a tree tap device embodying the present invention.

DESCRIPTION OF PREFERRED EMBODIMENTS

Figure 1:
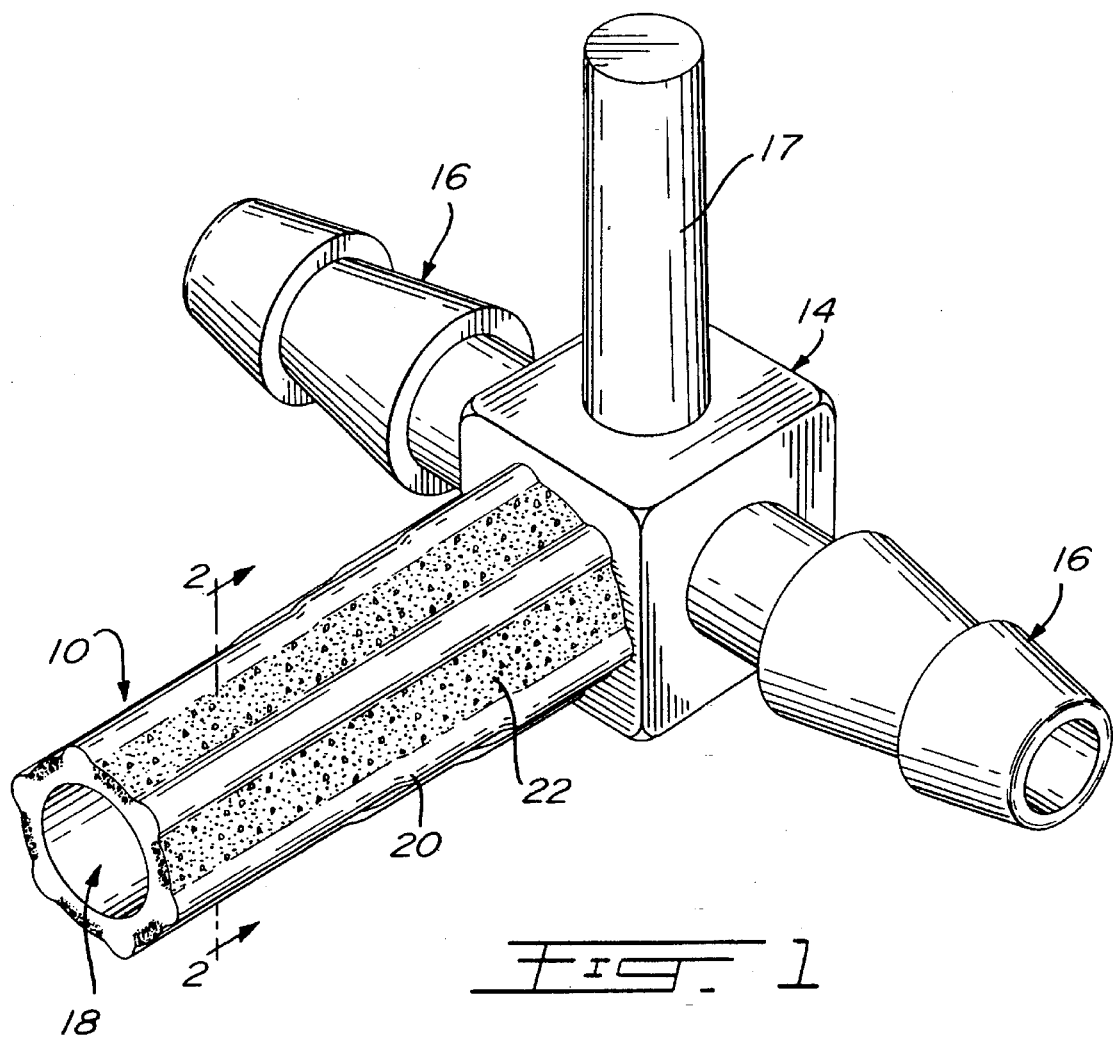
FIG. 1 is a perspective view showing a tube made in accordance with the present invention mounted to a tube connecting device used in a sap collecting system.

Referring to FIG. 1, there is shown the end portion of a conventional tubular conductor 10 mounted to a fitting or tube connecting device 14 having three arms 16, one of which is engaged in the sap collecting passageway 18 of the tube 10. Two other arms 16 are normally connected to the sap tubings going from a maple to another. Extension 17 serves as a holding part for a cap (not shown) used to cover the arms 16 when not used.

The tubular conductor 10 is formed of a body normally molded, preferably with food grade flexible PVC or polyethylene and having an annular cross section and displaying a series of longitudinal bosses 20 on the outer wall thereof. The tubular conductor 10 can be formed of a body having an annular cross section without bosses 20 on its external surface.

The present invention is concerned with embedding in the plastics material a plurality of non corrosive hard granules, which granules may consist of sand, silica, glass, stainless steel and aluminum. These type of granules have sufficient hardness to repress rodent animals from piercing or cutting the plastics material. Also, they must be distributed such that at least one granule will be contacted whenever the body is gnawed by a rodent animal. The tubes of the present invention are made by co-extrusion and, in order that this may be satisfactorily achieved, the granules should have a dimension of about 0.5 mm. Also, the distribution of these granules within the plastics material should be about between 10% to 50% of the total weight of the body.

Co-extrusion is a process to make profiles, such as tubings, with different material in the same mold wherein each material is melted and pushed under pressure with a different extruder connected on a single mold built to receive and distribute two or more different materials in the same mold to obtain a product with multi-materials with different properties welded together.

Figure 2:
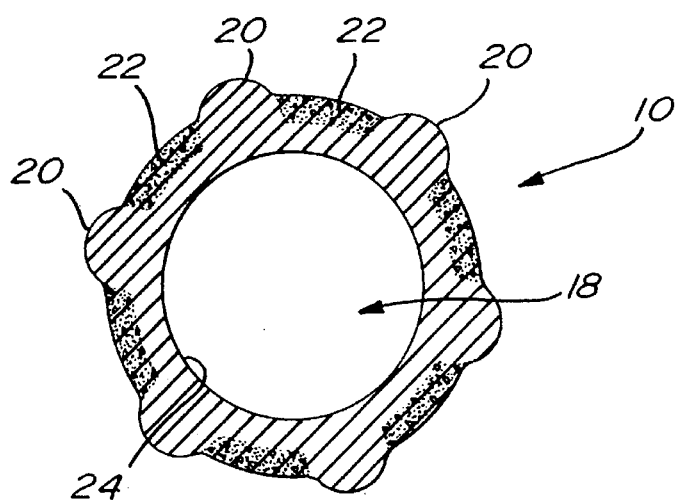
FIG. 2 is a cross-sectional taken along lines 2—2 of FIG. 1.

In the embodiment illustrated in FIGS. 1 and 2, the granules form a series of layers 22 between the bosses 20 by a co-extrusion process.

It is important to note that, when a device is formed by a co-extrusion process, the granules do not extend to the inner wall 24 of the passageway 18. The presence of granules on wall 24 would result in the accumulation of bacteria causing damage to the sap and giving poor quality of maple syrup. Also, the flow of sap being vacuum pumped in the passageway 18, certain granules could become detached from the wall and be collected in the flowing sap.

Referring to FIGS. 3 and 4, there is shown another embodiment of the present invention. A tubular connector 40 is again shown mounted to a connecting device 44 having three arms 46. The tubular conductor 40 has a sap passageway 48 while the arms each have a passageway 58. In this embodiment, the granules 50 are distributed throughout the plastics material of the tube 40 but terminate short of the inner wall 54 of the passageway 48, again for the reasons given above with respect to the embodiment illustrated in FIGS. 1 and 2.

In the embodiment illustrated in FIG. 3, the connecting device 44 is similarly constructed to device 14 of FIG. 1 with the exception of granules 56 incorporated in the plastics material. The connecting device 44 is made by an injection molding process and the granules 56, in this case, may extend to the inner wall 58 of its hollow passageways. By reason of the injection molding process, the granules that are present at the surface of the inner wall 58 define a smooth wall with the plastics material so that bacteria cannot be collected thereon and will not detach from the inner wall. This is due to the fact that injection molding process is done under very high pressure in the mold, giving a very smooth surface to the finish products.

FIG. 5 illustrates another device used in the collection of sap; it consists of a tree tap device 60 which has a portion 62 that is adapted to traverse the outer layers of a tree so that sap may be collected into its passageway 64 and passed into a tubular connector (not shown) mounted to the arm 66. The construction of this tap device consists of a body made of a composition similar to that of the connecting device 44 of FIG. 3; it is formed of a composition of plastics material and of granules which are distributed throughout the plastics material, even to the inner wall of the passageway 64, as this device 60 is also formed by injection molding.

Although the invention has been defined with respect to various forms, it will be evident to the person skilled in the art that it may be modified and refined in various ways. It is therefore wished to have it understood that the present invention is not limited in scope, except by the terms of the following claims.

The embodiments of the invention in which an exclusive property or privilege is claimed are defined as follows:

1. A device for use in a sap collecting system comprising a body of fluid impermeable composition defining therein a passageway for allowing sap to circulate therethrough; said composition consisting of plastics material and of a plurality of randomly distributed non-corrosive hard granules; said granules having sufficient hardness to repress rodent animals to pierce or cut said plastics material and having a distribution such that one or more granules are contacted when said body is gnawed by a rodent animal.

2. A device as defined in claim 1, wherein said body is a co-extruded tube.

3. A device as defined in claim 2, wherein said granules are distributed on the outer wall of said tube.

4. A device as defined in claim 2, wherein said granules are distributed within said tube, except on the wall of said passageway.

5. A device as defined in claim 1, wherein said body is an injection molded fitting.

6. A device as defined in claim 1, wherein said granules are of a material selected from a group comprising sand, silica, glass, stainless steel and aluminum.

7. A device as defined in claim 6, wherein each said granule has a dimension of about 0.5 mm.

8. A device as defined in claim 6, wherein said distribution of granules represent between 10% and 50% of the total weight of said body.

9. A device as defined in claim 2, wherein said granules are of a material selected from a group comprising sand, silica, glass, stainless steel and aluminum.

10. A device as defined in claim 3, wherein said granules are of a material selected from a group comprising sand, silica, glass, stainless steel and aluminum.

11. A device as defined in claim 4, wherein said granules are of a material selected from a group comprising sand, silica, glass, stainless steel and aluminum.

12. A device as defined in claim 5, wherein said granules are of a material selected from a group comprising sand, silica, glass, stainless steel and aluminum.

* * * * *